US008584458B2

United States Patent
Teng et al.

(10) Patent No.: US 8,584,458 B2
(45) Date of Patent: Nov. 19, 2013

(54) EXHAUST POWER TURBINE DRIVEN EGR PUMP FOR DIESEL ENGINES

(75) Inventors: Ho Teng, Canton, MI (US); Gerhard Regner, San Diego, CA (US); Gary Hunter, Dexter, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 472 days.

(21) Appl. No.: 12/785,095

(22) Filed: May 21, 2010

(65) Prior Publication Data

US 2010/0293943 A1   Nov. 25, 2010

Related U.S. Application Data

(60) Provisional application No. 61/180,493, filed on May 22, 2009.

(51) Int. Cl.
*F02B 33/44* (2006.01)

(52) U.S. Cl.
USPC ............. 60/605.2; 60/600; 60/604; 60/605.1; 60/616; 60/299

(58) Field of Classification Search
USPC ............. 60/605.2, 600, 604, 605.1, 616, 299
See application file for complete search history.

(56) References Cited

U.S. PATENT DOCUMENTS

| 7,207,311 | B2 * | 4/2007 | Chmela et al. ................ 123/305 |
| 7,591,131 | B2 | 9/2009 | Easley, Jr. et al. |
| 7,757,678 | B2 * | 7/2010 | Marsh et al. ............. 123/568.12 |
| 8,015,809 | B2 * | 9/2011 | Watson ........................ 60/605.2 |

FOREIGN PATENT DOCUMENTS

JP    2001132442 A  *  5/2001

OTHER PUBLICATIONS

U.S. Appl. No. 12/785,071, "Air Turbine Driven EGR Pump for Diesel Engines," filed May 21, 2010.
Southwest Research Institute, "Low Emissions Potential of EGR-SCR-DDF and Advanced Fuel Formulations—A Progress Report," Oct. 2002.

* cited by examiner

*Primary Examiner* — Ching Chang
(74) *Attorney, Agent, or Firm* — Harness, Dickey & Pierce, P.L.C.

(57) ABSTRACT

A power plant includes an engine configured to receive charge air and produce exhaust. A first turbo machine is configured to be driven by the exhaust and drive a compressor that receives air. The compressor is configured to produce the charge air. A second turbo machine is configured to receive a portion of the exhaust and rotationally drive a pump in response thereto. High temperature and low temperature EGR heat exchangers are arranged in the exhaust gas recirculation passage serially relative to one another upstream from the pump. A heat exchanger arranged in the exhaust gas recirculation passage upstream from the pump. A water separator is arranged in the exhaust gas recirculation passage fluidly between the heat exchanger and the pump. An EGR catalyst is arranged in the exhaust gas recirculation passage upstream from the heat exchanger.

12 Claims, 1 Drawing Sheet

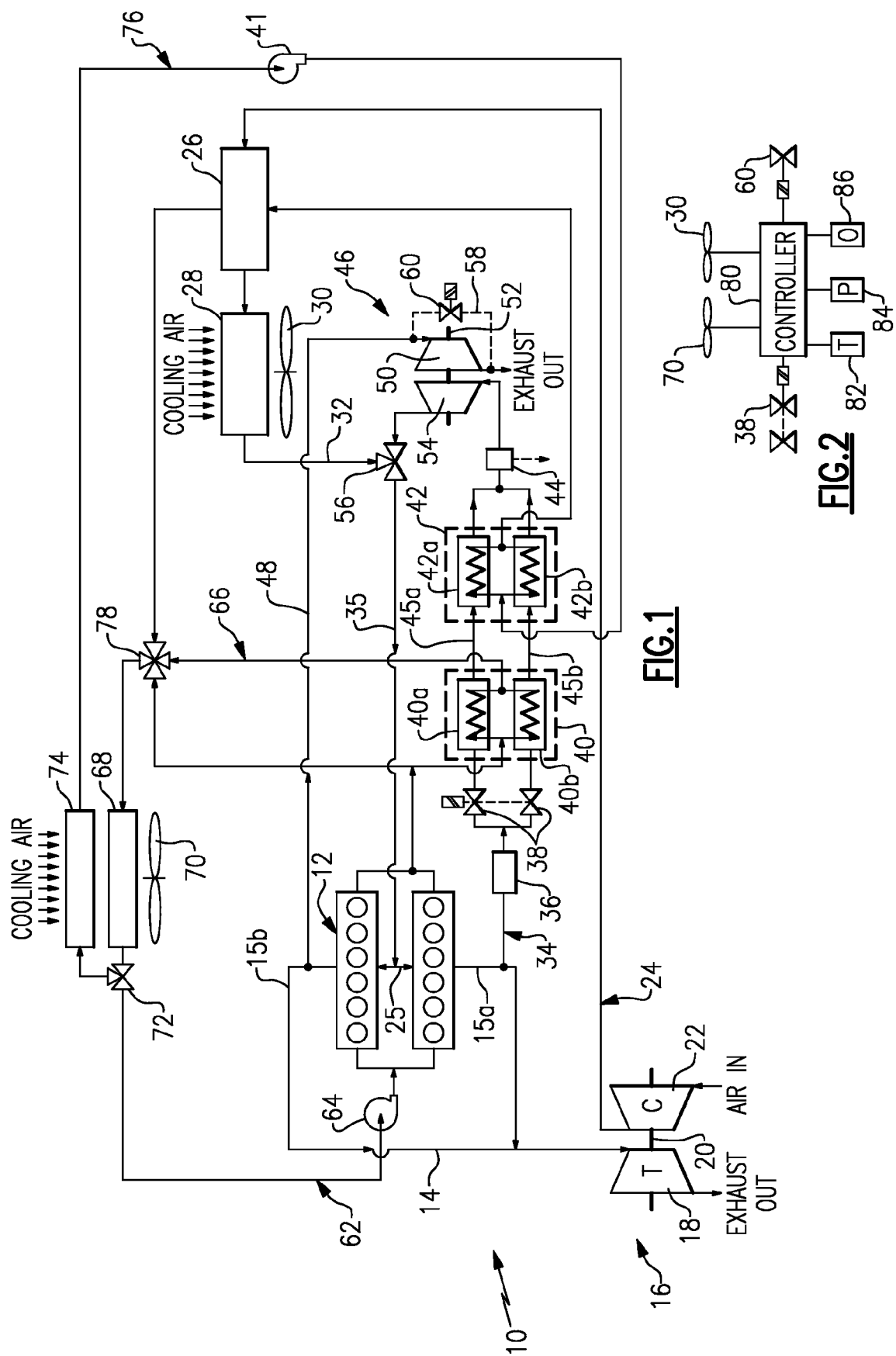

EXHAUST POWER TURBINE DRIVEN EGR PUMP FOR DIESEL ENGINES

This application claims priority to U.S. Provisional Application No. 61/180,493, filed on May 22, 2009.

BACKGROUND

This disclosure relates to turbo diesel engines having exhaust gas recirculation.

Large diesel engines are used in locomotive and off-road applications. Diesel engines for these applications are in the range of 3-5 megawatts, for example. It is desirable to recirculate the exhaust gases into the charge air stream to reduce the emissions of the diesel engine.

The intake pressure of large diesel engines is typically higher than the exhaust pressure. As a result, the exhaust gases must be pumped into the charge air to recirculate the exhaust gases. Electric motors are typically used as the exhaust gas recirculation pump. Electric motors can be difficult to package and may result in a fuel consumption penalty for the overall efficiency of the diesel engine.

SUMMARY

A power plant is disclosed that includes an engine configured to receive charge air and produce exhaust. A first turbo machine is configured to be driven by the exhaust and drive a compressor that receives air. The compressor is configured to produce the charge air. A second turbo machine is configured to receive a portion of the exhaust and rotationally drive a pump in response thereto. The pump is configured to receive an EGR from the exhaust and introducing the pumped EGR to the charge air.

In another aspect of the disclosure, the pump is arranged in the exhaust gas recirculation passage. High temperature and low temperature EGR heat exchangers are arranged in the exhaust gas recirculation passage serially relative to one another upstream from the pump. The low temperature EGR heat exchanger is arranged between the high temperature EGR heat exchanger and the pump. High and low temperature cooling circuits respectively including the high and low temperature EGR heat exchangers.

In another aspect of the disclosure, a heat exchanger arranged in the exhaust gas recirculation passage upstream from the pump. A water separator is arranged in the exhaust gas recirculation passage fluidly between the heat exchanger and the pump. An EGR catalyst is arranged in the exhaust gas recirculation passage upstream from the heat exchanger.

BRIEF DESCRIPTION OF THE DRAWINGS

The disclosure can be further understood by reference to the following detailed description when considered in connection with the accompanying drawings wherein:

FIG. 1 is a schematic view of an example powertrain system using exhaust gas recirculation.

FIG. 2 is a schematic of an example control system for the powertrain system illustrated in FIG. 1.

DETAILED DESCRIPTION

A power plant 10 includes an internal combustion diesel engine 12, which produces exhaust that is expelled through an exhaust passage 14. The exhaust passage 14 includes one or more exhaust manifolds 15a, 15b. Two exhaust manifolds 15a, 15b are shown in the example, which may be provided on opposing banks of a V-configured engine, for example. Other engine configurations may be used.

A first turbo machine 16, which includes a first turbine 18 and a compressor 22 coupled to a common shaft 20, is arranged in the exhaust passage 14, and, in particular, in the first manifold 15a. The first turbine 18 is rotationally driven by the expanding exhaust gases. The first turbine 18 may have a fixed geometry, variable geometry and/or a wastegate. The compressor 22 receives atmospheric air and is rotationally driven by the first turbine 18 to provide compressed air or charge air via a charge air passage 24 to an intake manifold 25 associated with the engine 12.

The charge air is provided from the first turbo machine 16 to a heat exchanger 26, which is a liquid-to-air configuration in the example, and then a cooler 28, which is an air-to-air configuration in the example. A fan 30 draws air through the cooler 28 before providing the cooled charge air 32 to an intake manifold of the engine 12. This significantly reduces the cooling load for the cooler 28 and allows better control of the temperature at the intake manifold 25 by regulating the speed of the fan 30. In one example, a controller 80 (FIG. 2) is programmed to selectively energize the fan 30 in response to temperature 82, pressure 84, and/or other 86 conditions to obtain a desired cooled charge air temperature, for example.

Returning to FIG. 1, exhaust gas recirculation air (EGR) is diverted from the exhaust passage 14 through an EGR passage 34 for introduction into the charge air passage 24 to reduce the overall emissions of the engine 12. The EGR flows through an EGR catalytic converter 36 before entering flow regulating valves 38 which controls the required EGR flow rate according to the engine operation (loads and speeds, for example). The EGR is typically initially at approximately at 500-600° C. The EGR enters a high temperature EGR cooler 40 where the temperature of the EGR is reduced to approximately 350° C.

The cooled EGR exiting the high temperature EGR cooler 40 flows serially into a low temperature EGR cooler 42 where the EGR is further cooled to approximately 60° C. The high and low temperature EGR coolers 40, 42 are liquid-to-gas heat exchangers in the example. Due to the significant reduction of temperature of the EGR no heat exchanger after the pump 54 is needed and, a water separator 44 is provided to remove the condensates from the EGR before introducing the EGR into the charge air flow passage 24. The EGR catalytic converter 36 and water separator 44 prevent hydrocarbon fouling that might occur upon introducing the EGR to the charge air.

The cooled EGR is received by a second turbo machine 46, which includes a second turbine 50 and a pump 54 coupled to a common shaft 52. A portion of exhaust gas 48 from the second exhaust manifold 15b is used to rotationally drive the second turbine 50 and the pump 54. Significantly reducing the temperature of the EGR entering the pump 54 using the high and low temperature EGR coolers 40, 42 reduces the power requirement of the second turbo machine 46 needed to drive the pump 54.

The amount of exhaust gas that is received by the second turbine 50 is regulated by a bypass passage 58 and bypass valve 60, which functions as an external waste gate, arranged within the bypass passage 58. The controller 80 (FIG. 2) is in communication with the bypass valve 60 and is programmed to control exhaust gas 48 through the second turbine 50 according to the flow rate of EGR and the pressure of the cooled charge air 32 whose pressure is approximately equal to the outlet pressure of the pump 54. The pumped EGR is provided to a mixer 56 where the EGR is introduced into the cooled charge air to provide diluted charge air 35.

The engine 12 includes a liquid cooling loop 62 that is circulated by a water pump 64. The coolant exits the engine 12 at approximately 90° C. before entering a high temperature cooling loop or circuit 66. The coolant from the engine 12 is provided to the high temperature EGR cooler 40 before being returned to a high temperature radiator 68. The coolant exits the high temperature EGR cooler 40 at approximately 100° C.

A portion of the coolant is diverted from the coolant loop 62 by a valve 72 to a low temperature coolant loop or circuit 76. The diverted coolant flows through a low temperature radiator 74 and its pressure is boosted by a water pump 41 before being sent to the low temperature EGR cooler 42. A fan 70 draws cooling air from the atmosphere through the low and high temperature radiators 74, 68. In one example, a controller 80 (FIG. 2) is programmed to selectively energize the fan 70 in response to temperature 82, pressure 84, and/or other 86 conditions to obtain a desired coolant temperature in one or both of the high and low temperature coolant circuits 66, 76, for example.

Returning to FIG. 1, the low temperature coolant loop 76 provides coolant at around 40° C. to the low temperature EGR cooler 42 where it exits the low temperature EGR cooler at approximately 50° C. before flowing through the heat exchanger 26. The low temperature coolant is returned to the engine coolant loop 62 through a mixer 78. In the example, the low temperature coolant is reintroduced to the engine coolant loop 62 before entering the high temperature radiator 68.

In the example, the high temperature EGR cooler 40 includes first and second EGR heat exchangers 40a, 40b that are arranged parallel to one another. The low temperature EGR heat exchanger 42 includes first and second low temperature EGR heat exchangers 42a, 42b arranged parallel to one another. The first high and low temperature EGR heat exchangers 40a, 42a are arranged in series with one another to provide a first EGR flow path 45a. The second high and low temperature EGR heat exchangers 40b, 42b are arranged in series with one another to provide a second EGR flow path 45b. The first and second EGR flow paths 45a, 45b converge before the pump 54. During low EGR flow conditions, one of the first and second EGR flow paths 45a, 45b can be shut off by the flow regulating valves 38.

Although an example embodiment has been disclosed, a worker of ordinary skill in this art would recognize that certain modifications would come within the scope of the claims. For that reason, the following claims should be studied to determine their true scope and content.

What is claimed is:

1. A power plant comprising:
   an exhaust gas recirculation passage;
   a pump arranged in the exhaust gas recirculation passage;
   a high temperature EGR heat exchanger and a low temperature EGR heat exchanger arranged in the exhaust gas recirculation passage serially relative to one another and upstream from the pump, the low temperature EGR heat exchanger arranged between the high temperature EGR heat exchanger and the pump; and
   high and low temperature cooling circuits respectively including the high and low temperature EGR heat exchangers.

2. The power plant according to claim 1, wherein the high temperature EGR heat exchanger includes first and second high temperature EGR heat exchangers arranged parallel to one another, and the low temperature EGR heat exchanger includes first and second low temperature EGR heat exchangers arranged parallel to one another, the first high and low temperature EGR heat exchangers arranged in series with one another to provide a first EGR flow path, and the second high and low temperature EGR heat exchangers arranged in series with one another to provide a second EGR flow path.

3. The power plant according to claim 2, comprising a flow regulating valve arranged in the exhaust gas recirculation passage, and a controller in communication with the flow regulating valve and programmed to regulate exhaust flow through the first and second EGR flow paths.

4. The power plant according to claim 2, wherein the high temperature cooling circuit is operable to fluidly communicate with the low temperature cooling circuit.

5. The power plant according to claim 2, wherein the high temperature cooling circuit is operable to fluidly communicate with an engine.

6. The power plant according to claim 1, comprising an engine having intake and exhaust manifolds, an engine coolant loop including the high and low temperature cooling circuits, the exhaust gas recirculation passage fluidly interconnecting the exhaust and intake manifolds, a turbo machine configured to provide charge air to the intake manifold through a charge air passage, and a heat exchanger arranged in the charge air passage and the low temperature cooling circuit.

7. The power plant according to claim 6, comprising a fan configured to be in fluid communication with high and low temperature radiators that are respectively arranged in the high and low temperature cooling circuits, and a controller in configuration with the fan and configured to energize the fan in response to a predetermined condition.

8. The power plant according to claim 6, comprising a cooler arrange in the charge air passage and a fan configured to be in fluid communication with the cooler, and a controller in configuration with the fan and configured to energize the fan in response to a predetermined condition.

9. The power plant according to claim 6, wherein no heat exchanger is arranged in the exhaust gas recirculation passage downstream from the pump between the pump and the intake manifold.

10. A power plant comprising:
    an exhaust gas recirculation passage;
    an pump arranged in the exhaust gas recirculation passage;
    a heat exchanger arranged in the exhaust gas recirculation passage upstream from the pump;
    a cooling circuit, including the heat exchanger;
    a water separator arranged in the exhaust gas recirculation passage fluidly between the heat exchanger and the pump; and
    an EGR catalyst arranged in the exhaust gas recirculation passage upstream from the heat exchanger.

11. The power plant according to claim 10, comprising a high temperature EGR heat exchanger and a low temperature EGR heat exchanger arranged in the exhaust gas recirculation passage serially relative to one another upstream from the pump, the low temperature EGR heat exchanger arranged between the high temperature EGR heat exchanger and the pump, and high and low temperature cooling circuits respectively including the high and low temperature EGR heat exchangers.

12. The power plant according to claim 10, comprising an engine having intake and exhaust manifolds, the exhaust gas recirculation passage fluidly interconnecting the exhaust and intake manifolds, wherein no heat exchanger is arranged in the exhaust gas recirculation passage downstream from the pump between the pump and the intake manifold.

* * * * *